United States Patent [19]
Luitwieler

[11] 3,859,532
[45] Jan. 7, 1975

[54] COSMIC ENERGY OVERLOAD DETECTOR

[75] Inventor: Samuel H. Luitwieler, La Habra, Calif.

[73] Assignee: Beekman Instruments, Inc., Fullerton, Calif.

[22] Filed: Mar. 26, 1973

[21] Appl. No.: 344,821

[52] U.S. Cl.................. 250/369, 250/336, 328/165
[51] Int. Cl............................ H03b 1/00, G01t 1/20
[58] Field of Search..... 328/116, 117, 150163, 165, 328/162; 250/369, 336, 354

[56] References Cited
UNITED STATES PATENTS

| | | | |
|---|---|---|---|
| 2,778,949 | 1/1957 | Borkowski et al.................. | 250/369 |
| 3,094,665 | 6/1963 | Wildman............................ | 328/117 |
| 3,246,150 | 4/1966 | Stoddart et al..................... | 250/369 |
| 3,548,206 | 12/1970 | Ogle et al. ......................... | 328/163 |

Primary Examiner—Harold A. Dixon
Attorney, Agent, or Firm—John G. Mesaros; R. J. Steinmeyer

[57] ABSTRACT

Apparatus for measuring a radiation source level by means of a detector such as a scintillator or the like, the apparatus having a signal channel for providing a source of signal pulses from the detector indicative of the radiation level to an output device, and a timer channel for preselecting a time period of signal pulse measurement. The detector output is coupled to a comparator biased for providing an output signal in response to an input indicative of an excess radiation pulse such as a cosmic energy overload, the output of the amplifier triggering a predetermined time delay for inhibiting the signal channel and timer channel for the time duration of the overload.

5 Claims, 1 Drawing Figure

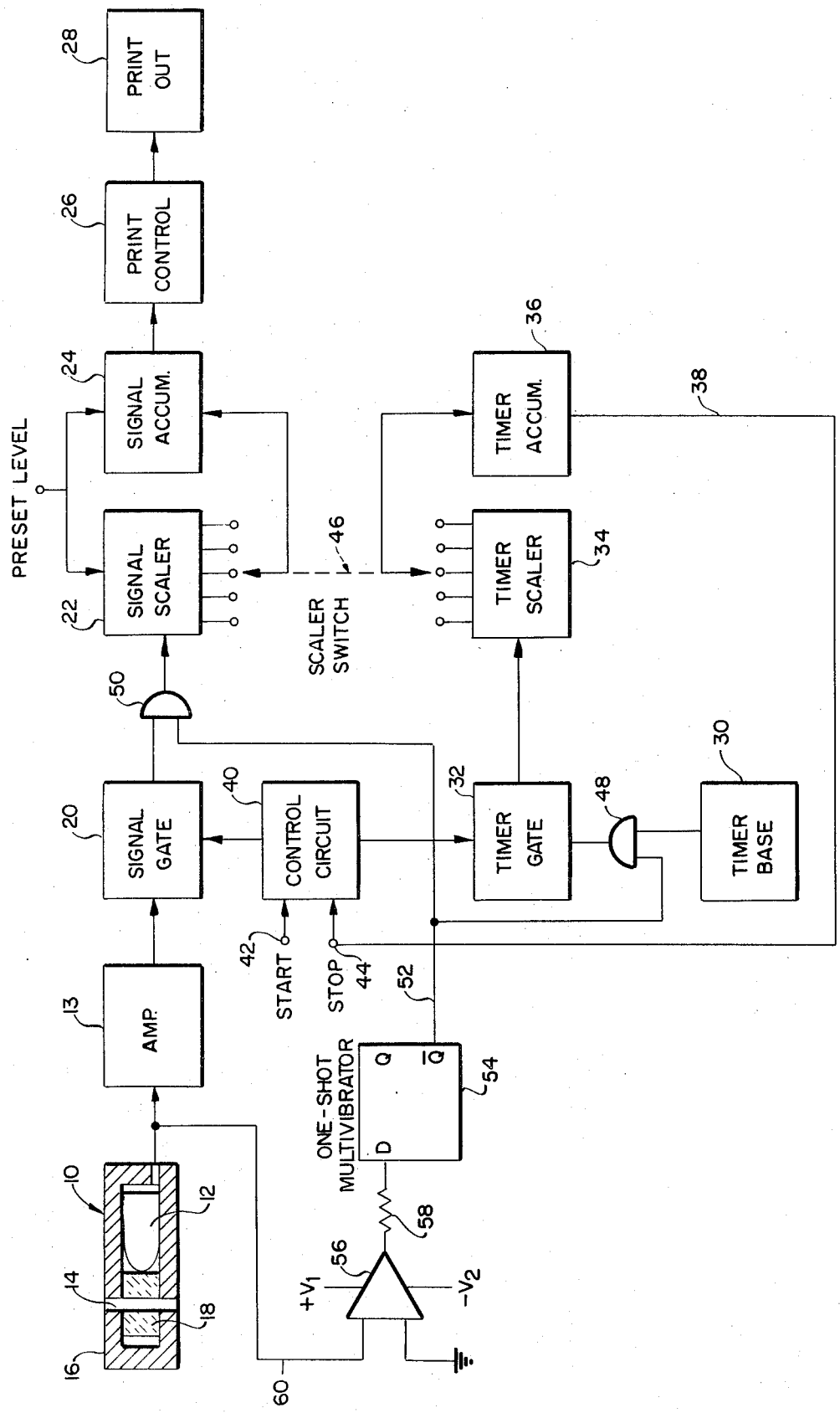

COSMIC ENERGY OVERLOAD DETECTOR

BACKGROUND OF THE INVENTION

This invention relates to apparatus for measuring the radiation level of a radiation source, and more particularly relates to novel detecting apparatus effective to detect, count and measure the level of gamma ray radiation of a source, with provision made for automatically inhibiting the measurement during periods of cosmic energy surges.

In radiation source measuring apparatus, such as gamma ray measurement, a scintillator and photosensitive element is utilized to measure the radiation emanating from a source in proximity thereto. The detector assembly is suitably shielded to minimize the introduction into the scintillator and photosensitive element of radiation external to the detector assembly. However, notwithstanding the shielding within the detector assembly, when extra terrestrial disturbances occur, cosmic energy surges produce large amounts of radiation which impinge on the scintillator, thereby creating massive crystal disturbances which overpower the radiation source being measured to thereby render the apparatus useless for the time duration of the cosmic energy surge. Any readings or measurement during this time period are erroneous and provide no indication of the activity level of the radiation source.

SUMMARY OF THE INVENTION

Accordingly, it is an object of this invention to provide a new and improved radiation source measuring apparatus.

It is another object of this invention to provide a radiation source measuring apparatus having a cosmic energy overload detector.

It is a further object of this invention to provide a cosmic energy overload detector which automatically inhibits the signal channel and timer channel of the radiation source measuring apparatus for a time duration approximating the time of the energy surge.

The foregoing and other objects of the invention are accomplished by providing radiation source measuring apparatus having a detector providing pulses to a signal channel under control of a timer channel to provide an output indicative of the gamma ray activity of a radiation source in proximity to the detector. The detector is coupled to an operational amplifier input having the bias thereof preset in a comparator mode to generate an output in response to the output of the detector being in excess of a predetermined level, the level being indicative of, for example, a pulse output response to a cosmic energy disturbance. The output of the operational amplifier is coupled to a one-shot multivibrator having a predetermined time delay consistent with the anticipated time duration of the cosmic energy disturbance. Upon energization of the one-shot multivibrator, signal pulses to the signal scaler of the signal channel and timing pulses to the timer scaler of the timer channel are inhibited for the time duration of the predetermined time delay to automatically eliminate useless information which would otherwise be obtained during the cosmic energy disturbance.

Other objects, features and advantages of the invention will become apparent from the following specification taken in conjunction with the accompanying drawing.

BRIEF DESCRIPTION OF THE DRAWING

The sole FIGURE is a partially diagrammatic partially schematic representation of a radiation source measuring apparatus including a cosmic energy overload detector in accordance with the invention.

DESCRIPTION OF THE PREFERRED EMBODIMENT

Referring now to the drawing, there is shown a detector assembly 10 for mounting a sample for counting by a scintillator and photosensitive element, the detector 10 including a cylindrical lead housing having viewing openings at its ends within which may be positioned a suitable photomultiplier tube 12 connected to a suitable amplifier 13 for converting light impulses received by said tube to a pulse output. The detector 10 is provided with an opening 14 extending vertically across the interior cross section of housing 16, with said opening being surrounded by a scintillator 18. This opening may have tubular elements supported therein for supporting radioactive materials contained in suitable vials or test tubes. The scintillator may be of any suitable material known to the art and preferably surround opening 14, such scintillator having flat ends and being of cylindrical cross section with an opening extending vertically across its diameter for receiving the sample containing means.

The output of the photomultiplier pulse amplifier 13 is fed to a signal gate 20 which opens or closes the signal channel consisting of the switchable signal scaler 22 and signal accumulator 24. The signal accumulator 24 provides an output through a print controller 26 to a suitable print-out device 28. The signal scaler 22 and signal accumulator 24 are provided with a preset level input, which input may be derived on the basis of a background subtraction level or the like (such as shown in U.S. Pat. No. 3,246,150).

A timer base generator 30 is provided for feeding a pulse time signal to timer gate 32 which opens or closes the timer channel consisting of the switchable timer scaler 34 and timer accumulator 36 which provides its output signal through lead 38 to the "stop" input of control circuit 40.

The control circuit 40 is provided for simultaneously operating signal gate 20 and timer gate 32 either to open them when its "start" terminal 42 is operated or to close them when its "stop" terminal 44 is operated by the output signal from timer accumulator 36 through lead 38.

As illustrated, the switchable signal scaler 22 and timer scaler 34 are provided with a common switching means 46 so that they will be switched simultaneously during selection of a desired predetermined counting time. It is to be understood, however, that the scaler switch 46 may be two independently operated switches, one for the signal scaler 22 and another for the timer scaler 34.

The radiation source measuring apparatus thus far described, conventionally operates by insertion of a preset level input into the signal scaler 22 and signal accumulator 24, appropriate setting of the scaler switch 46 to the desired predetermined counting time, with the signals indicative of the activity level of the radiation source being transmitted along the signal channel under control of the timer channel. The signal pulses emanating from photomultiplier tube 12 are generally, for example, in the order of magnitude of 5 volts, while cosmic energy pulses affecting the scintillator 18 and photomultiplier tube 12 will generate pulses in the order of magnitude of 5 to 20 volts, and oftentimes cosmic signals from a gamma detector may be very large (20 volts or more) and can exceed the capability of the photomultiplier tube 12 and the signal processing electronics, causing erroneous counts. Effectively, the detector system will be dead to all other legitimate pulses for a finite period of time. In order to compensate for this, interposed intermediate the timer base 30 and the timer gate 32 is an AND gate 48, and interposed between the signal gate 20 and the signal scaler 22 is a second AND gate 50. Both AND gates 48 and 50 are two-input gates with the second inputs thereof being coupled together at lead 52 which is tied to the "$\overline{Q}$" output of a one-shot multivibrator 54. This output is normally "high" thereby normally enabling AND gates 48 and 50. The input to the multivibrator 54 is provided from an operational amplifier 56 through a current limiting resistor 58 to the input of multivibrator 54. The amplifier 56 is biased in a comparator mode between a positive source of voltage $+V_1$ and a negative source of voltage $-V_2$, with the input thereof on lead 60 being coupled to the output of the photomultiplier tube 12.

In operation the bias of comparator 56 is established so that the voltage of pulses from photomultiplier tube 12 in excess of a predetermined voltage, such as 5 volts, initiate an output through current limiting resistor 58 to the one-shot multivibrator 54 which has a time constant of a predetermined value (such as approximately 20 microseconds) consistent with the anticipated time duration of cosmic interference anticipated. Upon the application of the input to the multivibrator 54 the "$\overline{Q}$" output goes "low," thereby disabling AND gates 48 and 50 to inhibit pulses from timer base 30 to the timer gate 32, as well as inhibit signal pulses through signal gate 20 to the signal scaler 22 for the predetermined time period.

Accordingly, it can be seen that by utilization of the overload detector herein described, an abnormal overload such as cosmic energy interference can be sensed, and the signal pulse counts can be inhibited from entering the signal scaler 22 until the photomultiplier tube 12 and electronics are able to count normal pulses.

Provision is also made for compensation for counting errors at high sample count rates during the length of time the scaler is inhibited by inhibiting the timing pulses to the timer gate 32 for the length of time the signal scaler 22 is unable to accumulate sample counts.

While there has been shown and described a preferred embodiment, it is to be understood that various other adaptations and modifications may be made within the spirit and scope of the invention.

I claim:

1. In radiation source measuring apparatus having a signal channel transmitting signal pulses from a radiation source detector to an output device under control of a timer channel providing timing pulses indicative of a predetermined time period for measurement of the signal pulses, the combination comprising:
    means coupled to the output of said detector for providing a signal only in response to a detector output in excess of a predetermined level; and
    time delay means responsive to said signal for simultaneously inhibiting the timing pulses in said timing channel and the signal pulses in said signal channel for the predetermined time duration of said time delay means.

2. The combination according to claim 1 wherein the radiation source measuring apparatus includes a signal scaler in the signal channel receiving signal pulses from a signal gate through normally enabled gate means, said gate means being disabled in response to said time delay means.

3. The combination according to claim 2 wherein the radiation source measuring apparatus includes a timer scaler in the timer channel receiving timing pulses from a timer gate which receives timing pulses from a timer base means through normally enabled second gate means, said second gate means being disabled in response to said time delay means.

4. The combination according to claim 3 wherein said time delay means is a one-shot multivibrator having the output thereof coupled to said first and second gate means.

5. The combination according to claim 4 wherein said means coupled to the detector output is a comparator providing a signal to said multivibrator input.

* * * * *